(12) United States Patent
Sayce et al.

(10) Patent No.: US 11,878,937 B2
(45) Date of Patent: Jan. 23, 2024

(54) PURIFICATION OF QUARTZ POWDERS BY REMOVAL OF MICROPARTICLES OF REFRACTORY MATERIALS

(71) Applicants: Heraeus Quarzglas GmbH & Co. KG, Hanau (DE); Heraeus Conamic UK Limited, Wallsend (GB)

(72) Inventors: Ian George Sayce, Wallsend (GB); Michael Schindler, Wallsend (GB); Fabian Schildt, Hanau (DE); Eduard Visnow, Hanau (DE)

(73) Assignees: Heraeus Quarzglas GmbH & Co. KG, Hanau (DE); Heraeus Conamic UK Limited, Tyne and Wear (GB)

( * ) Notice: Subject to any disclaimer, the term of this patent is extended or adjusted under 35 U.S.C. 154(b) by 576 days.

(21) Appl. No.: 16/925,944

(22) Filed: Jul. 10, 2020

(65) Prior Publication Data
US 2021/0009461 A1 Jan. 14, 2021

(30) Foreign Application Priority Data
Jul. 12, 2019 (EP) ..................................... 19186021

(51) Int. Cl.
*C03C 3/06* (2006.01)
*C22B 59/00* (2006.01)
(Continued)

(52) U.S. Cl.
CPC ................ *C03C 3/06* (2013.01); *B03B 5/623* (2013.01); *C01B 33/12* (2013.01); *C03C 1/022* (2013.01);
(Continued)

(58) Field of Classification Search
CPC .... B01J 2208/00672; B01J 2208/00991; B01J 8/24; B03B 5/623; C01B 33/12; C01P 2004/03; C01P 2004/61; C01P 2006/80; C03C 1/022; C03C 2201/02; C03C 3/06; C22B 3/22; C22B 59/00; C22B 60/0252; C22B 60/0291
See application file for complete search history.

(56) References Cited

U.S. PATENT DOCUMENTS 4,804,422 A 2/1989 Papanikolau et al.
5,637,284 A 6/1997 Sato et al.
(Continued)

FOREIGN PATENT DOCUMENTS

CA 1184740 A * 4/1985
CN 102303870 1/2012
(Continued)

OTHER PUBLICATIONS

Zhongqi Han et al., "Powder Technical Dictionary: Chinese-English-Japanese Comparison", p. 382, Wuhan University of Technology Press (Mar. 1999) with English Chinese Office Action translation.

*Primary Examiner* — Shuangyi Abu Ali
(74) *Attorney, Agent, or Firm* — Dicke, Billig & Czaja, PLLC

(57) ABSTRACT

Described is a process for the refinement of a quartz powder, comprising the step of separating microparticles of refractory minerals, in particular minerals containing rare earth metal compounds, from the quartz powder by an elutriation step.

12 Claims, 6 Drawing Sheets

(51) Int. Cl.
  *C22B 60/02* (2006.01)
  *C22B 3/22* (2006.01)
  *B03B 5/62* (2006.01)
  *C01B 33/12* (2006.01)
  *C03C 1/02* (2006.01)

(52) U.S. Cl.
  CPC ............... *C22B 3/22* (2013.01); *C22B 59/00* (2013.01); *C22B 60/0252* (2013.01); *C22B 60/0291* (2013.01); *C01P 2004/03* (2013.01); *C01P 2004/61* (2013.01); *C01P 2006/80* (2013.01); *C03C 2201/02* (2013.01)

(56) References Cited

U.S. PATENT DOCUMENTS

| | | | |
|---|---|---|---|
| 6,746,655 B1 * | 6/2004 | Becker | C03C 1/022 423/340 |
| 7,837,955 B2 | 11/2010 | Goldblatt et al. | |
| 7,935,326 B2 | 5/2011 | Kanda et al. | |
| 9,776,194 B2 | 10/2017 | Schindler | |
| 10,676,388 B2 | 6/2020 | Huenermann et al. | |
| 2020/0123039 A1 | 4/2020 | Gromann et al. | |

FOREIGN PATENT DOCUMENTS

| | | | |
|---|---|---|---|
| CN | 104843718 | | 8/2015 |
| CN | 106082238 | | 11/2016 |
| CN | 107827115 A | * | 3/2018 |
| CN | 109665528 | | 4/2019 |
| DE | 160967 | | 7/1984 |
| EP | 0737653 | | 10/1996 |
| EP | 1942078 | | 7/2008 |
| JP | S62-30632 | | 2/1987 |
| JP | H066495 | | 1/1994 |
| JP | 2005060209 | | 3/2005 |
| TW | 201738179 | | 11/2017 |
| TW | 201814056 | | 4/2018 |
| TW | 201904893 | | 2/2019 |

* cited by examiner

30 Elutriation Column
31 Entry of water
32 Exit of water to fine filter
33 Porous PTFE membrane
34 Ultrasonic probe

PURIFICATION OF QUARTZ POWDERS BY REMOVAL OF MICROPARTICLES OF REFRACTORY MATERIALS

CROSS-REFERENCED TO RELATED APPLICATION

This Utility Patent Application claims priority to European Application No. 19186021.2 filed on Jul. 12, 2019, which is incorporated herein by reference.

TECHNICAL FIELD

One aspect relates to a process for the refinement of a quartz powder by eliminating microparticles of refractory minerals, including specific minerals containing rare earth compounds, from the quartz powder. Moreover, one aspect is directed to the use of an elutriation process to eliminate these microparticles of refractory minerals from a quartz powder. Finally, one aspect also relates to the quartz powder prepared according to one embodiment and which has a low content of these microparticles of refractory minerals.

BACKGROUND

Fused quartz glass, i.e. glass made by melting refined natural quartz powders, is used in many applications in industry today. Long known for its use in lamp envelopes, laboratory ware etc., it has been used as a container or contact material in semiconductor fabrication, and even in the manufacture of optical fibres. However, for some of these latter applications the purity achieved by quartz refinement procedures currently known is not ideal. For this reason, the majority of optical fibres are today made entirely from synthetic fused silica, and, for the highest quality semiconductor applications, a synthetic glass is also desirable.

In the early days of optical fibre for telecommunications, the majority of the fibre was comprised of glass made by fusion of highly refined natural quartz crystal. However, as the industry advanced, fibre breakage became a serious problem, and a major source of these breaks was found to be due to discrete micron-, or submicron-sized particles of refractory minerals, typically such minerals as monazites and xenotimes, i.e. mixed rare-earth phosphates, and occasional rare-earth oxides, which had not been removed by the quartz refinement techniques then available. These microparticles exist to a greater or lesser degree in all sources of natural quartz crystal, and are particularly notable in the quartz obtained from pegmatite rocks, which include a major source of the high purity quartz powders used in the industry today.

In such commercially available refined quartz powders these refractory microparticles generally have a size of less than 25 μm, typically less than 5 μm, and indeed the majority are much smaller, typically less than 1 μm, i.e. of colloidal particle size. Without being bound by any theory, it is assumed that because of their small size, these particles experience an electrical potential at the surface when in an aqueous suspension, and may become electrostatically bonded to the silica grains by forces which dominate over the forces of gravity and drag that affect particles of larger dimensions. Such interactions become increasingly significant at particle sizes of less than 10 μm. Furthermore, while these microparticles have proved difficult to eliminate from quartz powders, because of their extreme inertness and very high melting point, and they have hitherto proved impossible to eliminate from the resulting fused quartz glass products.

Fibre break studies have shown that particles of size less than 0.5 μm may cause breakage of an optical fibre if present in the cladding glass. As a consequence, the majority of the optical fibre industry has for many years demanded synthetic fused quartz, from which the absence of such particles could be guaranteed.

More recently it has become apparent that for certain applications in the semiconductor industry it is also desirable to replace certain critical quartz glass components with parts made from synthetic fused silica. This is because there is a risk that occasional refractory mineral particles might become exposed at the surface of the quartz glass, and enter the environment as dust particles which could reach the wafer being treated and lead to loss in yield. It is also notable that some of these refractory mineral particles contain thorium and uranium, and the presence of such radioactive species is particularly undesirable in a semiconductor fabrication process. Finally, these insoluble microparticles can present problems in certain processes for the fusion of quartz, since, under some circumstances they can provide nucleation sites for bubble growth in the fused quartz products.

In summary, the presence of refractory mineral microparticles leads to problems if they are present in quartz powder materials with regard to the ultimate optical quality, in particular the quality required for the most critical semiconductor plasma etch applications, and for the use in the preparation of optical fibre claddings.

If these refractory minerals could be eliminated, or at least substantially reduced, in the course of the quartz refinement process, fused quartz glass would be a potential alternative to synthetic silica in some of the above-mentioned applications.

Currently a standard method of generating a high purity quartz powder for fusion involves crushing and milling the raw material (typically a pegmatite rock), sieving, magnetic separation, froth flotation and leaching with an acid, for example hydrofluoric acid, optionally mixed with a second mineral acid (e.g. hydrochloric, nitric or sulphuric acid). The powder is subsequently washed with pure water and dried, before being used for the manufacture of fused quartz.

Additionally, the quartz powder may be subjected to a high temperature treatment in a reactive gas, for example via passage through a rotary kiln in the presence of a chlorine-containing atmosphere, e.g. $Cl_2$ or HCl. Such hot chlorination processes as part of the process for generating a quartz powder of high purity are described, for example, in EP 0 737 653 A and U.S. Pat. No. 7,837,955 B. During such a hot chlorination process, impurity particles, such as the refractory minerals, which are present inside of the grain may crack the grain particle and the refractory mineral may thereby become exposed, or even liberated at the surface of the quartz powder. Thus, if a hot chlorination or other high temperature treatment step is carried out during the quartz powder refinement it might be expected to expose refractory mineral microparticles, and facilitate their removal by a suitable process.

Despite the extensive refinement provided by known processes, the resulting quartz powders available today have still retained a level of refractory minerals unacceptable for the most critical applications.

The prior art situation for the refinement of quartz powder can be summarised as follows:

CN 106082238 A discloses a process for the preparation of a quartz powder in which a starting material is pulverised (crushed and finely ground) and subjected to a hot chlorination process. After the hot chlorination process, the resulting quartz powder is subjected to a sequence of two further process steps, whereby the first process step is a water quenching of the quartz powder and the second step is the leaching of the quartz powder with a mixture of acids, including hydrofluoric, hydrochloric, sulphuric and oxalic acids. During this leaching step, an ultrasonic treatment may be applied. Thereafter the solid phase is separated from the liquid phase by filtration, before the solid residue is washed and dried. CN 106082238 A does not teach or suggest the same problem as the present embodiments to remove any insoluble refractory mineral microparticles from the quartz powder and although the leaching step may lead to some release of particulate refractory minerals from possible attachment to the grains of quartz powder, the refractory mineral microparticles which are the subject of the present embodiments are insoluble in the above acid mixture, and are of such a small particle size that, unless some form of elutriation is employed to achieve separation, it is to be expected that they will remain adhering to, and contaminating, the quartz powder particles in any subsequent conventional filtration step. No analytical figures are provided, and there is no evidence that any significant separation of refractory mineral microparticles from the quartz powder is achieved.

DD 160 967 A discloses a process for the purification of quartz powder in which the starting material is at first subjected to a milling and grinding step and thereafter treated with hydrochloric acid. As the next steps, the quartz powder is subjected to a hot chlorination process and treated with hydrofluoric acid. After this acid treatment, the acid is separated from the quartz powder by filtration. As the refractory minerals remain unaffected by the treatment with hydrofluoric acid, the acid separation suggested by DD 160 967 is not expected to lead to a removal of refractory mineral microparticles from the quartz powder, and such analytical figures as are provided provide no evidence to the contrary.

JP 6230632 A discloses a process for the preparation of high purity quartz glass from natural siliceous raw materials. During this preparation procedure, the quartz powder is subjected to a chlorination process and thereafter purified by an immersion treatment in a mixture of hydrofluoric and nitric acids. After washing with nitric acid and then water, the powder is filtered and dried. The analytical figures show that significant reduction in the content of the alkali metals (lithium, sodium and potassium) was achieved by the process, and also a major reduction in the content of the radioactive element uranium. The separation of refractory mineral microparticles is not addressed. Moreover, the immersion and washing treatment described in this Japanese prior art reference will not lead to a separation of refractory mineral microparticles from the quartz powder.

U.S. Pat. No. 4,804,422 discloses a process for treating quartz powders, potentially derived from a pegmatic source, after crushing and initial beneficiation by flotation, and magnetic separation. The quartz powder having a particle size of usually less than 0.5 mm is treated in hydrofluoric acid for a period sufficient to dissolve at least 40% of the weight of the quartz sand, rinsed with demineralised water, and then treated with hot hydrochloric acid for at least 30 minutes. The latter step is said to be beneficial in reducing the level of phosphate impurities; however, it has turned out that this procedure does not eliminate all the refractory mineral microparticles. There is no indication that there is any attempt to separate such refractory mineral microparticles by elutriation. A filter is provided at the top of the bed to prevent escape of particles from the bed, and onward passage through the acid circulation pump, but it is evident that any particles collected at the filter will remain in the leach vessel, together with the quartz powder being treated. Thus, the refractory minerals are well-mixed with the much larger quartz particles at the end of the process, and may even be attached to the quartz powder particles. Any removal of microparticles could be avoided only by operating at low flow, to permit elutriation, and additionally by the use of a fine (sub-micron) filter in the passage for the circulation of the liquid phase which is, however, not used in the disclosed process. Without such a fine filter any micron-, and submicron-sized particles passing through the filter will remain in the recirculating acid, and return to the leach vessel. The product powder after such a process is expected to retain a significant level of refractory microparticle contamination.

CN 102303870 A describes a process for leaching quartz sand in a fluidised bed. The various configurations described all incorporate a cylindrical fluidisation vessel in which the particles are suspended in an upward flow of heated acid, which is recirculated by means of a pump. At the top of the vessel, the acid overflows into a circumferential trough, and any sand particles that are carried over are collected in a "grit basin". It is obvious that this "grit basin" is used for settlement and removal ("precipitation") of sand particles before the acid passes on through the pump. Any refractory mineral microparticles, for example having a particle size of less than 5 μm, will not settle out at this point, but will remain in suspension to be recirculated with the flowing acid. Thus, there is no disclosure of how to remove refractory mineral microparticles with a particle size of less than 5 μm.

CN 104843718 A discloses a process for the anaerobic chlorination of silica, whereby the chlorination is carried out in a vertical chlorination reactor, followed by a treatment in an acid extraction tank and a flotation in a specific gravity tank to remove impurities. The disclosure according to this prior art reference is completely silent with regard to the specific conditions of the treatment of the flotation in the specific gravity tank. Moreover, it is not mentioned which impurities are removed from the silica in the flotation procedure.

U.S. Pat. No. 9,776,194 discloses an analytical method for detecting the presence of large particles of refractory minerals (so-called heavy minerals) in quartz powders, i.e. particles of size comparable to that of the quartz sand, without providing a sufficient way how to remove these impurities in any manufacturing process. The method described in U.S. Pat. No. 9,776,194 consists of conditioning the quartz powder suspected of containing refractory minerals such as heavy mineral particles as an aqueous pulp using a froth-flotation agent; subjecting the conditioned pulp to froth flotation to obtain a tailing; combining the tailing with an aqueous solution having a density greater than that of quartz and less than that of a heavy mineral which it is desired to separate; and finally centrifuging the combination in order to provide a settlement of the refractory minerals. This technique may be convenient for investigating the presence of refractory minerals in an analytical sample of quartz powder, but it requires an aqueous solution of an expensive chemical reagent (e.g. sodium heteropolytungstate), and centrifuging of the sample at high speed, which is possible for samples of limited size but unsuitable for the practical refinement of quartz on an industrial scale. Furthermore, as practised in the past on commercial high purity quartz powders, this analytical technique did not reveal the presence of refractory mineral microparticles of size less than 10 µm.

U.S. Pat. No. 6,746,655 relates to a method for the cleaning of $SiO_2$ grain by filling the particles in a vertical reactor and by treating them with an upward flow of fluidising gas (HCl) (forming thus a fluidised bed) at a temperature at least 1000° C. to form gaseous metal chlorides or other volatile compounds which can be removed from the reactor via the exhaust gas. The flow velocity is set to at least 10 cm/s and the retention time may be approximately by 12 hours. This method is used for the removal of metallic contaminations of Li, Na, Mg, Cu, Fe, Ni, Cr, Mn, V, Ba, Pb, C, B and Zr, whereby the separation of refractory mineral microparticles from quartz powder is not mentioned at all. Furthermore, U.S. Pat. No. 6,746,655 does not disclose a filter with a pore size of 0.7 µm or less and relates merely to the presence of a dust separator for separating finest dust and contaminations in the form of condensed compounds from the exhaust gas stream. The process described herein is not a process of elutriation and no liquid fluid is used.

EP 1 942 078 A relates to a purification method of a silica powder according to which the silica powder is brought into a fluid state (in a fluidised bed) and is contacting with the purification gas (HCl or $Cl_2$) at high temperature (1200° C.) and thereby removing impurity components of the silica powder having high ionicity (alkali impurity components). For this purpose, the silica powder in the fluid state is positioned in a magnetic field region. Like the method of U.S. Pat. No. 6,746,655, in said method the impurity components (e.g. Li, Na, K) are contacted and reacted with the purification gas on the silica powder surface so as to be vaporized (become a chloride gas and the like) and the generated gases are exhausted. To summarize, the process of EP 1 942 078 A is a process of purification in a hot gas stream by reaction with impurities, and removal as vapor. A process of elutriation in a liquid medium is not described.

CA 1 184 740 A relates to a method of producing high purity silica according to which iron oxide and impurities such as feldspar and other alumina and calcia-bearing compounds can be removed from silica or quartz concentrates (from both the surface and occluded) by treating the concentrate with agitation with an aqueous solution containing 3 to 20% by weight HF at a temperature about 50° C. for several hours. The impurities (feldspar, alumina and calcia-bearing compounds) dissolve at a greater rate than the silica and can separated as a slime (de-sliming or flotation) or can be washed off with water. According to CA 1 184 740 A, the quartz or silica concentrate has already been subjected to a prior treatment (beneficiation) such as size separation, wet or dry screening, magnetic separation, flotation, or a combination of them. Furthermore, there is no mention of the content of rare earth minerals either before or after the treatment described.

Thus, there is a need for a new process for the refinement of quartz powders which will allow the removal of contaminating refractory mineral microparticles from the quartz powder.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
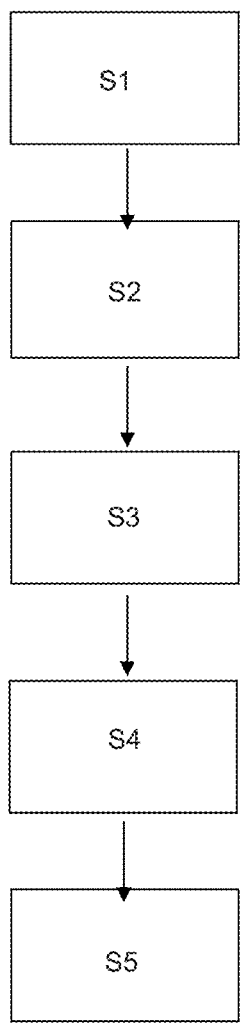
FIG. 1 illustrates a schematic diagram of one process route according to one embodiment.

In the following Detailed Description, reference is made to the accompanying drawings, which form a part hereof, and in which is illustrated by way of illustration specific embodiments in which one embodiments may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present embodiments. The following detailed description, therefore, is not to be taken in a limiting sense, and the scope of the present embodiments are defined by the appended claims.

It is to be understood that the features of the various exemplary embodiments described herein may be combined with each other, unless specifically noted otherwise.

One aspect is to provide a method for the refinement (purification) of a quartz powder, wherein refractory mineral microparticles are efficiently removed.

One aspect of the present embodiment is a process for the refinement of a quartz powder including the step of separating microparticles of refractory minerals out of the quartz powder by an elutriation step, whereby said microparticles of refractory minerals include minerals containing rare earth metals and/or thorium and/or uranium, and the elutriation step is carried out in a fluidised bed reactor in which a controlled upward flow of a liquid elutriation phase is provided, by which the microparticles of the refractory minerals are carried upwards in the fluidised bed reactor, whereas the quartz powder remains in the lower region of the fluidised bed reactor.

One aspect of the present embodiment is a process for the refinement of a quartz powder, including the step of separating microparticles of refractory minerals out of the quartz powder by an elutriation step, whereby the quartz powder to be refined has a size from 75 to 1000 µm, the refractory minerals have a particle size of less than 50 µm. In one aspect of the present embodiment, an elutriation step is understood in one embodiment to be carried out in a fluidised bed reactor in which a controlled upward flow of a liquid elutriation phase is provided, by which the microparticles of the refractory minerals are carried upwards in the fluidised bed reactor, whereas the quartz powder remains in the lower region of the fluidised bed reactor.

It has been surprisingly discovered that contaminating refractory mineral microparticles can be removed from a quartz powder during a new refinement process which ensures firstly that the refractory minerals do not remain bonded to the quartz crystals and secondly in which the quartz powder is subjected to an elutriation step.

In the present embodiment, elutriation means a process for separating particles based on their size, shape and/or density, using a stream of liquid flowing in a direction usually opposite to the direction of sedimentation. Thus, elutriation as used in one embodiment is a reverse sedimentation process in which the particles to be separated, i.e. the quartz particles and the refractory mineral particles, are dispersed in an upward-flowing stream of fluid, so that, despite the greater density of the refractory mineral microparticles, they may be separated from the particles of quartz powder by using a vertically-directed stream of liquid. However, in one embodiment and (unusually) despite their higher density, the refractory mineral microparticles are levitated relative to the quartz particles in the upward flow of liquid, and emerge in, and may be separated from, the overflowing liquid, leaving the lower density quartz particles in the elutriation vessel.

Accordingly, one embodiment is based on the finding that it is possible to separate small diameter heavy RE microparticles from the larger particles of lower density quartz sand by upward elutriation of the RE microparticles, despite their higher density.

In one embodiment, refractory microparticles means solid particles of minerals or other synthetic inorganic materials that have high melting points and/or are heat-resistant. These particles have a size of in general less than 50 μm, in particular less than 25 μm, in particular less than 10 μm, in particular less than 5 μm, in particular less than 1 μm.

In one embodiment, the refractory minerals include rare earth materials, such as rare earth minerals (=minerals containing rare earth metals) and/or rare earth metals. Thus, the process according to one embodiment is in particular suitable to separate and remove rare earth materials as refractory minerals from quartz powder. Rare earth materials in the sense of one embodiment are so-called "heavy minerals" which include, without limitation, monazites of all kinds (mixed rare earth phosphates) and xenotimes (i.e. mineral complex rare earth minerals containing yttrium phosphate as a major component). In addition to these rare earth materials, the rare earth materials to be removed from the quartz powder may include low levels of radioactive metals, such as thorium and uranium. Such minerals may be present in relatively small quantities (less than 1 ppm) in bulk quartz crystal powders, but they have proved difficult to remove by methods standard in the industry, and even such low levels are undesirable in transparent fused quartz glass products as already addressed above.

Thus, the rare earth materials to be removed from the quartz powder are predominantly rare earth phosphates and are for example selected from the group consisting of monazite-(Ce) (Ce, La, Nd, Th)$PO_4$, monazite-(La) (La, Ce, Nd)$PO_4$, monazite-(Nd) (Nd, La, Ce)$PO_4$, monazite-(Sm) (Sm, Gd, Ce, Th)$PO4$ and xenotimes, comprising yttrium orthophosphate ($YPO_4$) in association with a variety of other rare earth elements, and potentially Ca, U, Th, Si, F and As Moreover, it has been found out that the process step of elutriation also provides the possibility of removing radioactive materials such as thorium and uranium out of the quartz powder.

Exemplary monazite and xenotime particles found in commercial refined quartz powders and analysed by laser ablation ICP-MS analysis had the chemical composition shown in Table 1 below.

TABLE 1

LA -ICP-MS Analysis of Individual Particles
Elemental composition (wt %)

| Isotope | Monazite | | | | Xenotime | | |
|---|---|---|---|---|---|---|---|
| | 1 | 2 | 3 | 4 | 1 | 2 | 3 |
| $^{89}$Y | 3.10 | 2.2 | 1.4 | 3.5 | 51.80 | 66.1 | 64.5 |
| $^{139}$La | 19.65 | 8.3 | 4.8 | 21.2 | 0.02 | 0 | 0 |
| $^{140}$Ce | 34.54 | 49.3 | 54.8 | 29.2 | 0.09 | 0 | 0.1 |
| $^{141}$Pr | | 1.3 | 1.6 | 4 | | | |
| $^{146}$Nd | 18.64 | 4.3 | 4.3 | 18.9 | 0.34 | 0.4 | 0.5 |
| $^{147}$Sm | 5.65 | 3.9 | 1.9 | 6.1 | 0.96 | 1.3 | 1.8 |
| $^{157}$Gd | 4.10 | 2.9 | 1.6 | 4.7 | 4.57 | 6 | 7.1 |
| $^{163}$Dy | 1.22 | 1.1 | 1.1 | 1.6 | 8.75 | 11.2 | 12.1 |
| $^{232}$Th | 9.00 | 10.9 | 14 | 7.6 | 0.81 | 0.3 | 0.7 |
| $^{238}$U | 0.32 | 0.1 | 0.3 | 0.1 | 1.79 | 0.1 | 0.2 |

The table 1 illustrates the analysis of some individual particles of complex rare earth particles extracted from commercial quartz powders using the method of U.S. Pat. No. 9,776,194.

While there may be other microparticles of refractory minerals present, since monazites and xenotimes are found to be predominant, the materials to be separated from the quartz powder are referred together as RE (i.e. Rare Earth) microparticles in the following.

The process for the refinement of a quartz powder according to one embodiment can be summarised as follows:

As already mentioned, the process for the refinement of a quartz powder includes the step of separating RE microparticles out of the quartz powder by an elutriation step.

The elutriation step according to one embodiment may be carried out in a fluidised bed reactor. A fluidised bed reactor is known to the person skilled in the art. In this type of reactor, a fluid (usually a gas or liquid, in one embodiment a liquid) is passed through a slurry of the quartz powder to be refined at a velocity sufficient to suspend a least a part of the solid and cause it to behave as though it were a fluid. This process is known as fluidisation. In one embodiment it is possible to use the fluidised bed reactor with a reactive fluid, such as hydrofluoric acid, and to effect an etching reaction on the surface of the quartz particles during elutriation. Alternatively, it is also possible to treat the suspended powder with an inert fluid such as water and to effect elutriation in the absence of any reaction of the powder with the fluid.

The solid substrate material (i.e. the quartz powder along with the RE microparticles) in the fluidised bed reactor is typically supported by a porous plate, known as a distributor. The fluid, presently referred to as the liquid elutriation phase, is then forced through the distributor up through the solid material. At lower fluid velocities, the solids remain in place as the fluid passes through the voids in the material. As the fluid velocity is increased, the reactor will reach a stage where the force of the fluid on the solids is enough to cause fluidisation of all the particles. In one embodiment, the vessel is in one embodiment of conical shape, and tapered to smaller diameter toward the bottom. Thus the upward velocity of the fluid decreases with increase in height. In this case there is a segregation by size of the quartz particles, with the large particles of quartz accumulating in the lower region of the fluidised bed reactor (in close proximity to the distributor), and the smaller quartz particles rising to the top. Despite the greater density of the RE microparticles relative to that of quartz, these microparticles are found to rise to the top of the fluidised bed reactor, due to their very much smaller size. In this stage, the intended separation of the quartz powder and the RE microparticles occurs.

Thus, the process according to one embodiment includes the step of separating RE microparticles out of the quartz powder by an elutriation step in which a controlled upward flow of a liquid elutriation phase is provided and by which the RE microparticles are carried upwards in the fluidised bed reactor, whereas the quartz powder grains remain in the lower region of the fluidised bed reactor. The lower region of the fluidised bed reactor is the region of the fluidised bed reactor in close proximity to the distributor and in which the quartz powder remains during the upward flow of the liquid elutriation phase.

Thus, one specific feature of one embodiment is that the process according to one embodiment is carried out in a fluidised bed reactor. The technical term of a fluidised bed reactor means in one embodiment an elutriation vessel permitting fluidisation of the suspended particles, when it is required to maintain all the particles in a homogeneous or inhomogeneous suspension. In that sense, the elutriation vessel to be used in the method according to one embodiment is an elutriation vessel, which may be used to permit leaching of the powder in acid, and with potential for use under conditions permitting fluidisation optionally including elutriation. In the process according to one embodiment, the RE microparticles which are carried upwards in the fluidised bed are in one embodiment either discharged out of the fluidised bed reactor together with the liquid elutriation phase or are separated from the liquid elutriation phase which material hereafter can be recycled.

As it is preferred that the liquid elutriation phase is recycled from the top of the fluidised bed reactor to the bottom of the fluidised bed, the removed RE microparticles in one embodiment need to be withdrawn out of the liquid elutriation before recycling.

Thus, in one further embodiment of the process, the liquid elutriation phase is recycled into the elutriation step and the RE microparticles are separated out of the liquid elutriation phase, for example by filtration.

The RE microparticles are separated from the elutriation phase in one embodiment by filtration of the elutriation phase by using a filter with a pore size of 0.7 μm or less.

In order to separate the RE microparticles from the quartz powder before the elutriation step, it is further preferred that the separation of the RE microparticles out of the quartz powder is supported by ultrasonic agitation or by agitation caused by a flow of a liquid or gas.

It may also be preferred, during acid treatment and subsequent elutriation, to provide suitable heating for the vessel, for the recirculating liquid or both. De-agglomeration of microparticles from the larger quartz grains may be promoted by control of pH, by addition of deflocculants, surfactants, chelating agents, etc. and may be facilitated by ultrasonic agitation or other means. Heating of the liquid phase may be beneficial in increasing the effectiveness of some of these processes.

For the sake of completeness, it should be noted that the elutriation can be applied during any stage in which an upward flow of liquid is realized, and is possible in particular during etching (such as etching with HF), subsequent rinsing (such as rinsing with HCl), and water washing, and in one or more of these steps.

Within the process, rinsing with a dilute HCl is beneficial after the HF leaching process, since, in case HF leaching is directly followed by water washing, a precipitate of silica gel might be prepared by hydrolysis of hexafluorosilicic acid present in the liquid phase. This is undesirable, but may be less of a problem if the etching acid mixture already includes an acid other than HF, such as for example, HCl or $HNO_3$.

As outlined in more detail below, the elutriation step according to one embodiment may be carried out in a cascade of process steps for the refinement of the quartz powder, in particular before or after a calcination and/or hot chlorination step of the quartz powder. Most of the other process steps for the refinement of quartz powder are known to the person skilled in the art.

Under conditions of elutriation the fluidised bed leaching and washing operations will lead to the segregation of the quartz powder by particle size, with the smaller quartz particles rising to the upper regions of the leach vessel. Thus, after the elutriation step, it is preferred that the refined quartz powder is homogenised before removal out of the fluidised bed reactor. This is to ensure that, on draining the slurry of quartz particles from the reactor, the particle size distribution of the powder is consistent and homogeneous throughout the batch. The homogenisation of the refined quartz powder may be carried out by agitation, in particular by a flow of a liquid or gas or by ultrasound.

The quartz powder to be refined has a size from usually 75 to 1000 μm, in one embodiment from 75 to 250 μm, whereas the RE microparticles have a particle size from usually less than 50 μm, in particular less than 25 μm, in particular less than 10 μm, in particular less than 5 μm, in particular less than 1 μm.

As explained in more detail below, the liquid elutriation phase is in one embodiment a leaching acid which is used for leaching of the quartz powder during common refinement processes. In such a case, the filter to remove the RE microparticles from the liquid elutriation phase used in a recycling mode is in one embodiment an acid-resistant filter. Alternatively, or additionally, the liquid elutriation phase may include the water flow which is used to remove traces of leach acid, and soluble products, prior to removal of the purified quartz from the vessel.

Moreover, the liquid elutriation phase is in particular an aqueous acid other than hydrofluoric acid, and used to wash the powder after acid leaching.

Furthermore, the liquid elutriation phase is in particular water, and used to wash the powder after acid leaching.

The source of the quartz powder to be used as a starting material in the refinement process according to one embodiment may be derived from a pegmatite, i.e. coarse-grained granitic igneous rock. These typically include an intimate mixture of feldspars, mica and quartz crystals as well as a diverse range of RE microparticles. By such processes as crushing, leaching, froth flotation etc. a considerable degree of refinement of the quartz is possible; indeed froth flotation is a standard technique in the industry. The publication McEwen et al, "Single-Stage Flotation of Alkali Feldspars, Ilmenite, Rutile, Garnet, and Monazite, with Mixed Cationic/Anionic Collectors", Society of Mining Engineers, AIME, vol. 260, pp 97-100 (1976)) describes the flotation of feldspar and other heavy minerals from quartz using cationic and/or anionic collectors. However, these techniques do not provide complete separation of contaminating species, and many smaller crystals of RE microparticles remain in the quartz powder and are not removed by conventional methods of quartz refinement.

Despite the fact that the density of the RE microparticles is significantly greater than that of the quartz particles the small size of the contaminating RE microparticles surprisingly allows the separation of the RE microparticles from the quartz powder particles by the process step of elutriation.

In the following, the elutriation step for the refinement of quartz powder is described in more detail.

Firstly, it is of an advantage that the RE microparticles to be removed from the quartz powder are exposed from the quartz powder, and secondly it is of an advantage to ensure that the RE microparticles do not remain bonded to the much larger particles of quartz crystal during the elutriation step. The first aspect is in one embodiment achieved by a suitable pre-treatment of the quartz powder before elutriation, and the second aspect is in one embodiment achieved by a suitable upward velocity of the liquid elutriation phase. Adhesion of the RE microparticles to the quartz grains, due for example the differing surface charge (agglomeration) may be overcome by continuous or intermittent ultrasonic agitation, by choice of pH or by other means.

One suitable pre-treatment of the quartz powder may be an acid leaching and washing step of the quartz powder for example in the preferred fluidised bed reactor, followed by operating the fluidised bed reactor in a specific elutriation mode. Alternatively these steps may be undertaken entirely at low fluid flows, adjusted to permit elutriation at each stage throughout the process.

Operating the fluidised bed in an elutriation mode means that the acid (used for the leaching step) or water (used for the washing step) is provided in the fluidised bed at an upward flow rate chosen to ensure that the majority of the quartz particles remain in the lower regions of the vessel, while the RE microparticles are carried upwards and removed over a weir at the top of the vessel out of the fluidised bed system. As noted above, the segregation may be facilitated by the use of a fluidised bed vessel of conical shape.

The acid leaching step may be undertaken prior to a step of hot chlorination, alternatively or additionally, since the high temperature treatment of the chlorination may liberate some of the RE microparticles which would otherwise remain attached to quartz grains, it may be beneficial to conduct the leaching, washing and elutriation after the chlorination step.

The chlorination step is a usual process step in the refinement procedure of quartz powder, and it is referred to the known state of the art.

The high density of the RE microparticles (e.g. the specific gravity of monazites is 4.6 to 5.7, and the specific gravity of xenotimes is 4.4 to 5.1) relative to that of quartz crystal (the specific gravity of a quartz particle is 2.65) might make elutriation as a means of lifting the RE microparticles appear unlikely. It has nevertheless proved possible to operate a fluidised bed reactor under conditions such that quartz grains sink, and the RE microparticles rise. This occurs because of the substantial difference in size of the respective particles. Thus, the particle size of the quartz powders of interest is typically in the range 75 to 250 µm, while the RE microparticles we are seeking to eliminate are typically less than 10 µm, and frequently less than 5 µm, and the majority (numerically) are less than 1 µm in size.

The smaller or lighter particles rise to the top (overflow) because their terminal sedimentation velocities are lower than the velocity of the rising fluid. The terminal velocity, or settling velocity, of a spherical particle in any fluid medium can be estimated using Stokes' law, if the flow is laminar, and the particles are in dilute suspension. According to this calculation, the velocity of the rising fluid can be defined in accordance with the specific conditions in the fluidised bed reactor. Due to the non-spherical shape of the particles, and their high concentration at least in the lower regions of the vessel, the calculation provides a useful guide as to the preferred velocity range required to levitate the RE microparticles, relative to the grains of quartz.

It is suspected that many, perhaps all, of the smallest RE microparticles are attached by chemical or physical bonding to the grains of quartz, or may even be contained within some grains. Thus, in one embodiment means must be found to permit release of these RE microparticles into the liquid medium. Such means may include, as already mentioned above, acid leaching and etching of the quartz powders, optionally under the influence of ultrasonic agitation, and high temperature calcination or heat treatment, optionally in a chlorine-containing environment, prior to the elutriation process, which again may be facilitated by ultrasonic agitation.

Agitation of the fluidised bed may alternatively be achieved without liquid recirculation by introduction of a gas, e.g. nitrogen, at the bottom of the bed, in which case the vessel is provided with an exhaust for the gas, leading to a scrubber. Thus a vessel of conical construction, fed with gas, or recirculating acid or water permits gentle agitation of the quartz grains, and homogenisation with regard to particle size, but, when in elutriation mode, with upward flow of liquid at a controlled low velocity, above the settling velocity of the RE microparticles, these RE microparticles may be lifted in the bath relative to the quartz particles, and leave the vessel via the overflow, when the liquid may be filtered.

The overflow used for the elimination of the liquid elutriation medium together with the RE microparticles is in one embodiment equipped with a filter to remove the RE microparticles out of the liquid elutriation medium before the liquid elutriation medium is recirculated into the bottom of the fluidised bed reactor. The filter to be used has in one embodiment a pore size of equal or less than 0.7 µm filter to remove the impurity minerals before returning to the bottom of the fluidised bed.

In the following and by reference to FIGS. 1 to 4, some embodiments to implement the elutriation step into common refinement processes of quartz powders are described. In all these embodiments, the quartz powder used as a starting material is subjected to standard pre-treatments 1 (S1), such as for example, crushing, grinding, sieving, magnetic and/or gravity separation, and froth flotation which typically lead to a quartz grain of the desired particle size distribution, and substantially free from foreign minerals, but still contaminated with RE microparticles.

FIG. 1 illustrates a schematic diagram of one process route according to one embodiment. The quartz powder used as a starting material is in one embodiment pretreated in step 1 (S1) by one of more of the following steps of crushing, grinding, sieving, magnetic and gravity separation and froth flotation. In a second process step S2 the pretreated starting material is subjected to an acid leaching, for example with hydrofluoric acid which can be used in combination with a mineral acid, such as hydrochloric or nitric acid. In a third step S3 the leached quartz powder is washed and elutriated according to one embodiment. The elutriation achieves the intended removal of the RE microparticles from the quartz powder, such is finally subjected to a drying step S4 and optionally a packing step S5.

Figure 2:
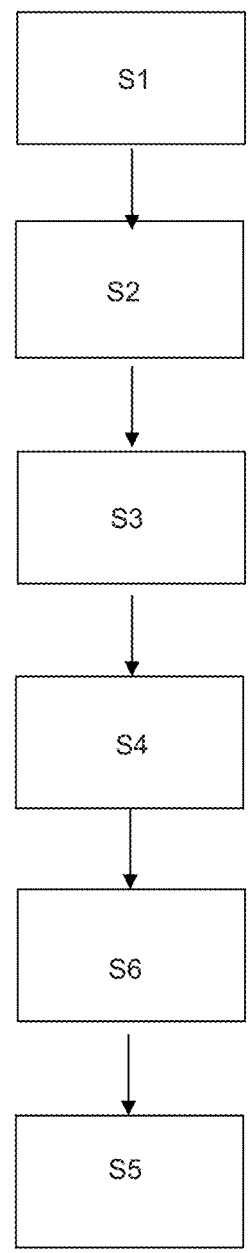
FIG. 2 illustrates a variation of the process described in FIG. 1.

FIG. 2 illustrates a variation of the process described in FIG. 1 in which the leached and dried powder may be subsequently treated by a hot chlorination step S6 after the elutriation step S3 and the drying step S4 and before the packaging step S5. The additional hot chlorination step S6 leads to a further purification, i.e. removal of traces of alkali metals, particularly sodium and potassium, and certain transition metals, e.g. iron.

Figure 3:
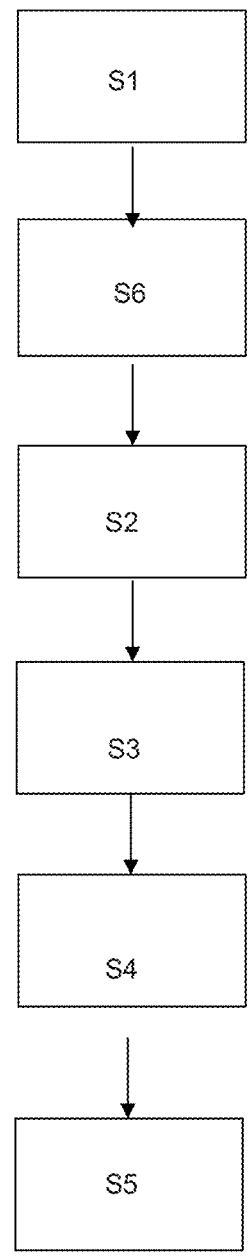
FIG. 3 illustrates a variation of the process described in FIG. 1.

FIG. 3 illustrates a variation of the process described in FIG. 1 in which the quartz powder may be additionally treated by hot chlorination S6 before the elutriation step S3. It is believed that, while this permits the removal of certain impurities, as volatile chlorides, the hot chlorination process may also cause some decrepitation of the quartz grains, and permit the exposure and even release of some bound rare-earth microparticles. When this is followed by the proposed leaching, washing and elutriation steps this may permit improved removal of the RE microparticles.

Figure 4:
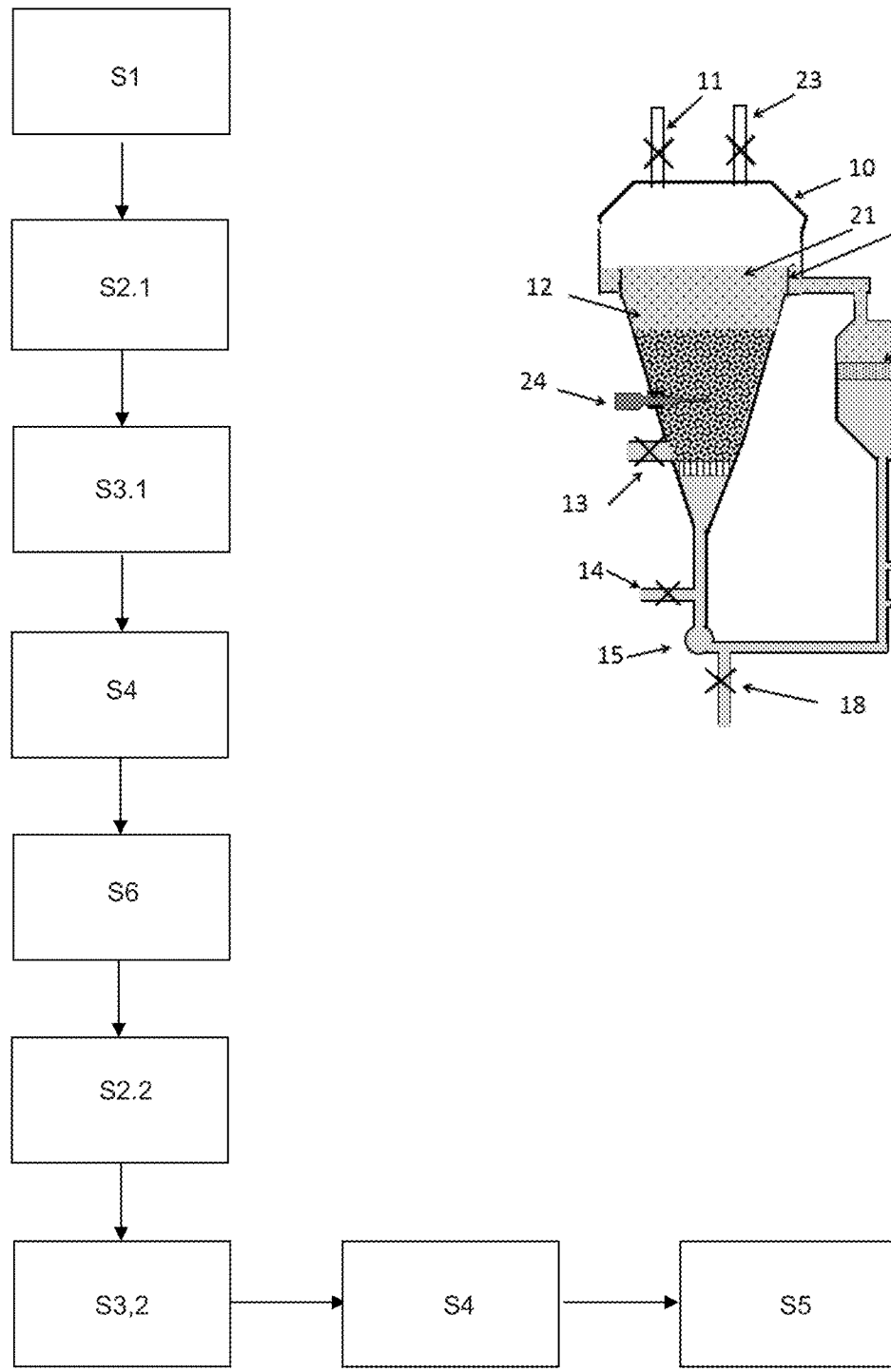
FIG. 4 illustrates a further route of the process according to one embodiment.

FIG. 4 illustrates a further route of the process according to one embodiment. After a pre-treatment processing S1, such as crushing, grinding, sieving, magnetic and gravity separation and flotation, the quartz powder is leached with an acid S2.1, such as a mixture of hydrofluoric acid and hydrochloric acid, and a first washing and elutriation step S3.1 is carried out to remove a first part of the RE microparticles of interest. After a drying step S4 a hot chlorination S6 is carried out and a second acid leaching step S2.2 with the same or similar acids is carried out before a second washing and elutriation step S3.2 provides a further removal of the RE microparticles. This second removal of the RE microparticles by elutriation is in particular of advantage because the hot chlorination step S6 carried out after the first elutriation step S3.1 might lead to the further release of RE microparticles. Finally, the usual process steps of drying S4 and packing S5 are carried out. This embodiment of FIG. 4 achieves the highest purity quartz powders.

As noted above, it may be convenient to operate all or much of the acid leaching and washing stages with a controlled flow of fluid, such as to permit progressive elutriation of the RE microparticles during each stage of the process.

The leaching process described in the above-mentioned embodiments and carried out in the process according to one embodiment uses an acid, typically a hydrofluoric acid, optionally with an added mineral acid, e.g. hydrochloric or nitric acid. The acid may be heated, either by reaction with the quartz powder, or by external heating means. Leaching with hydrofluoric acid may be followed by rinsing in dilute hydrochloric acid and then washing with water.

The process according to one embodiment ends usually with the washing of the quartz powder to remove acid, and draining of quartz grains from the vessel. Since the quartz will be sorted by grain size during the elutriation process, it has been found beneficial to agitate the bed significantly prior to drainage to permit thorough mixing of the quartz particles. This may be done by providing a high flow of liquid up through the bath, or alternatively by agitating the fluidised bed by introducing a gas, e.g. nitrogen at the bottom of the bed. On drainage of the slurry of quartz grain, it is then possible to provide a homogenised quartz powder, with uniform particle size distribution, as is generally required. The powder is then dried by conventional means, and packed for storage, transport, or immediate use.

It is possible that the acid leach process, and even the water washing process might be undertaken in separate vessels. However, it is also possible to use a single vessel for all these operations, and a suitable vessel is a fluidised bed reactor as illustrated schematically in FIG. 5.

The vessel 10 and associated pipework are made from a suitable acid-resistant material, for example polypropylene, PTFE, or alternative polymer, from polymer-coated metal etc. The lower region of the vessel 10 is in one embodiment of tapered or conical form, as this ensures a progressive decrease in the velocity of the upwardly flowing liquid, and aids segregation of fine particles during the elutriation phase of the process. At the bottom of the vessel is a membrane of a suitable porous material, which will retain the quartz particles, but will permit passage of liquids, and also the fluidising gas. Porous PTFE represents a suitable material for this membrane, although alternative materials are available.

The quartz powder to be treated may be introduced to the vessel via inlet 11. Acid (or later water) may be introduced at the bottom of the vessel, and flows upwards to form a fluidised bed. Fluidisation by recirculation of liquid leads to potential overflow of quartz powder, thus it is preferable when fluidisation without elutriation is required, once the vessel 10 is full of liquid, to achieve agitation and mixing of the bed by introducing a fluidising gas (e.g. nitrogen) at entry 14. Under these circumstances that gas leaves via the exit vent 23, and may be led to a suitable scrubber, to remove any spray, or acid fumes. Alternatively, it is possible to operate with low throughput of acid, in such a mode that progressive segregation of particles occurs, and the smallest particles may be carried to the top of the vessel and emerge in the overflowing liquid.

Following acid leaching of the suspended quartz particles, and optional rinsing with dilute HCl, during which the bed may be well agitated, the suspended powder is washed with high purity water, again optionally with agitation of the bed with gas, and then the bed is operated at reduced liquid flow, chosen to permit elutriation, i.e. lifting of the RE microparticles but sinking of the (larger) quartz particles. By slow re-circulation of water, the powders in the fluidised bed are allowed to segregate by particle size. As a result of the tapering shape of the vessel, the upward velocity of the fluid decreases with increasing height. Thus, the largest quartz particles with the highest sedimentation speed collect toward the bottom of the vessel, while smaller quartz particles accumulate higher up the vessel. The RE microparticles, having much lower sedimentation rate, are borne upwards, and as the vessel fills with liquid, they are caused to collect in the upper region of the vessel 12, and then to overflow via circumferential weir 19. They are then collected at fine filter 20 having a pore size of equal to, or smaller than, 0.7μm, while the elutriation liquid may be recirculated.

Figure 5:
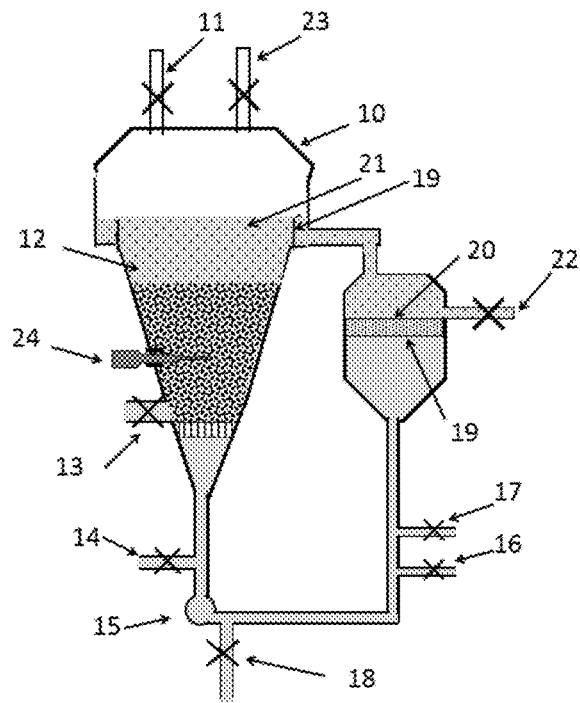
FIG. 5 illustrates a fluidised bed reactor in accordance with one embodiment.

In FIG. 5, the Following Reference Numbers are Used:
10 Fluidised bed leaching and washing vessel
11 Entry for quartz powder to be refined
12 Fluidised bed in elutriation mode
13 Exit for refined quartz powder
14 Entry for optional fluidizing gas
15 Liquid circulation pump
16 Entry for leach acid
17 Entry for wash water
18 Exit for liquids
19 Circumferential weir
20 Fine filter for refractory powders
21 Microparticles in supernatant liquid
22 Exit for microparticles 23 Vent for aeration gas
24 Ultrasonic probe It may be preferred, during acid treatment and subsequent elutriation, to provide suitable heating for the vessel, for the recirculating liquid or both. De-agglomeration of microparticles from the larger quartz grains may be promoted by control of pH, by addition of deflocculants, chelating agents etc. and may be facilitated by ultrasonic agitation or other means. Heating of the liquid phase may be beneficial in increasing the effectiveness of some of these processes.

While a single vessel of suitable design is sufficient to ensure a high degree of removal of the contaminating RE microparticles in current circumstances, it is possible to employ a second, or further vessels, connected in series. Thus the overflow from the first vessel may be directed into the input of a second vessel, of larger and progressively increasing diameter. In this way it is possible to achieve a sharper separation of the RE microparticles, should this be required.

Following elimination of the microparticles, and before draining the slurry of quartz particles from the fluidised bed, it is preferred that the slurry be effectively agitated to mix the segregated layers of quartz, for example by passage for gas (e.g. nitrogen) upward through the bed, or alternatively by introducing a high flow of water. Once suitably homogenised, the slurry can be drained via exit 13 into a suitable vessel for filtration and subsequent drying by conventional means.

One embodiment relates furthermore to the use of an elutriation step for the refinement of a quartz powder by removing rare earth minerals. This use is in particular characterised by the above-mentioned features of the claimed process.

Finally, one embodiment relates to a refined quartz powder which is obtainable according to the above-mentioned refinement process. These refined quartz powders are novel in view of those ones known from the prior art. The above-described process according to one embodiment provides the ability to separate RE microparticles from larger particles of quartz out of a mixture of quartz particles doped with such particles. Accordingly, the refined quartz powders according to one embodiment include a reduced level of RE microparticles as compared with quartz powders which are obtainable by the processes according to, for example, U.S. Pat. No. 6,746,655; EP 1 942 078 A; and CA 1 184 740 A. The processes described in these prior art references are unsuitable for the reduction of the RE microparticles from quartz at least in an efficiency provided for the first time by the method according to one embodiment.

EXPERIMENTAL SECTION

One embodiment is explained in more detail by referring to the following examples which do not restrict the claimed invention.

At first, an experimental verification of the approach was obtained by elutriation trials based on mixtures of typical refined quartz powder with known additions of RE microparticles which have been previously extracted from large quantities of such quartz powder. Numerically, the great majority of these particles are of size less than 5 μm in size. But occasionally larger particles of size 10 μm, or even 20 μm may be seen in SEM photographs (FIG. 6).

Figure 6:
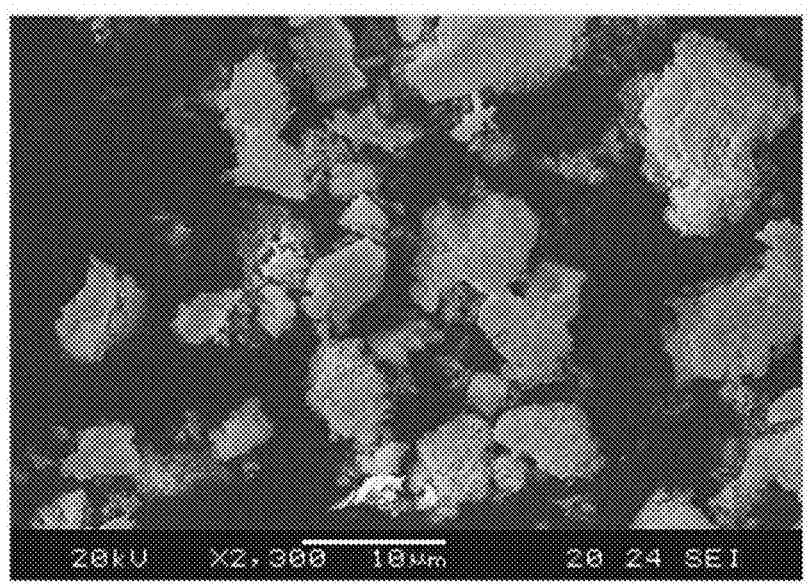
FIG. 6 is an SEM photograph illustrating larger particles sizes in accordance with one embodiment.

The quartz powder used in these trials was a commercially-available refined quartz powder which had been further treated by a hot chlorination refinement process (typically the purity of the quartz powder is more than 99.998% $SiO_2$, of nominal particle size 85-225 μm), to which were added weighed portions of RE microparticles previously derived from such quartz powders as seen in FIG. 6.

Example 1

A slurry was prepared comprising 20 g of refined quartz powder to which had been added 0.0125 g of RE microparticles. The slurry, contained within a glass vessel, was agitated for 2 minutes within a commercial ultrasonic cleaning bath, and then added to an elutriation column in which water was flowing slowly at such a rate that the quartz particles all descended, while water overflowed at the top. The overflowing water was filtered through a glass fibre filter of 0.7 μm pore size. The filter and residue were then treated with dilute hydrofluoric acid to dissolve the glass fibre leaving a residue of quartz and RE microparticles. Following removal of the hydrofluoric acid, the elutriated fines were processed using the density separation method which formed part of the analytical process described in patent U.S. Pat. No. 9,776,194 B. Using this process, 0.0025 g of RE micro-particles were recovered, indicating 20% removal of these particles from the initial quartz sample.

The refined quartz powder used as the starting material in the present example 1 did not correspond to the final quartz powder obtained by the process carried out in this example.

The starting material of the refined quartz powder is commercially available and has not been further treated to remove RE microparticles. The fact that only the added RE microparticles and not more RE microparticles are removed, does not mean that the starting material was free of RE microparticles as the example was carried out on a small scale and in a small scale of the starting material there are very few RE microparticles and, moreover, it might be necessary to use, for example, on HF etch to liberate some of the existing RE microparticles from the quartz powder. The difference in the weighed microparticles would have been minimal, but still existing.

Example 2

The previous trial was repeated, i.e. 20 grams of quartz doped with 0.0085 grams of RE microparticles. Following elutriation, 0.0032 g of RE microparticles were recovered using the same technique, indicating separation and recovery of 38% by weight of the RE microparticles from the initial quartz powder.

Example 3

The previous example was repeated, but with measured upward flow of water with a velocity of 120 mm/minute and an elutriation for 90 minutes. 20 grams of quartz doped with 0.0095 grams of RE microparticles were treated with a recovery of 0.0064 g of RE microparticles, indicating separation and recovery of 67% by weight of the RE microparticles from the initial quartz powder.

Figure 7A:
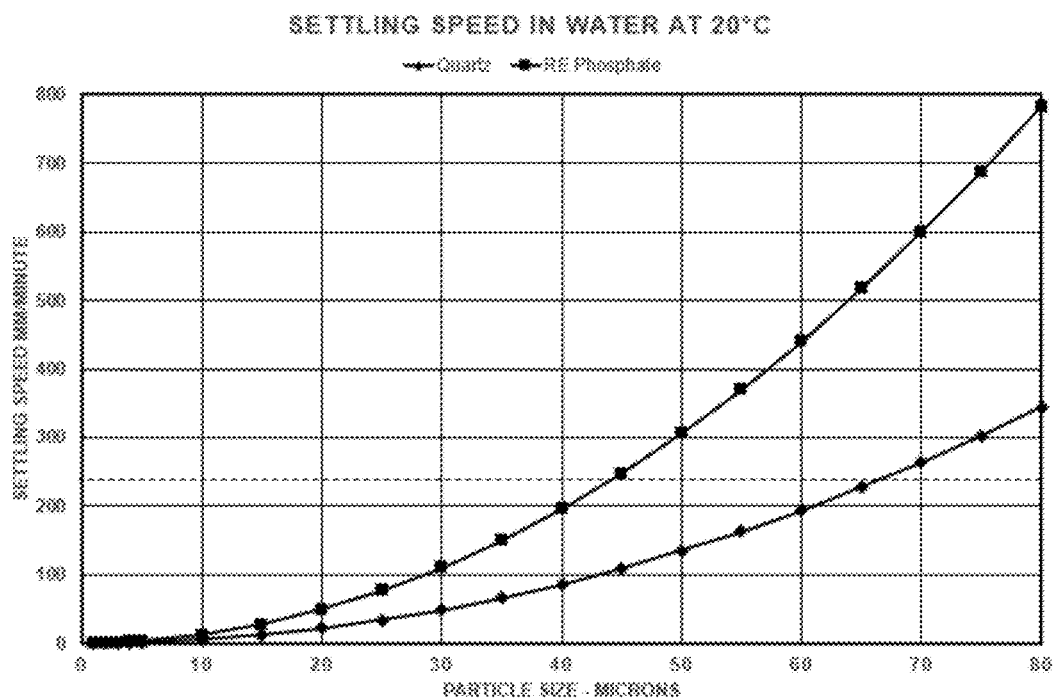
FIG. 7A-7C are plots relating particle size and settling speed in accordance with one embodiment.

A model of the elutriation process under the assumption of the viscous drag of water at 20° C. on spherical particles is provided by Stokes Law and the densities of quartz (2.65 g/cm$^3$) and a typical rare earth phosphate (4.75 g/cm$^3$) in water at 20° C. leads to the plot illustrated in FIG. 7A for the settling velocity of particles of the two materials. It appears that an upward velocity of ca. 240 mm/minute should allow quartz particles greater than ca. 67 μm to sink, while rare earth phosphate particles less than ca. 45 μm should rise, and could be removed from the bulk of the quartz sand.

Figure 7B:
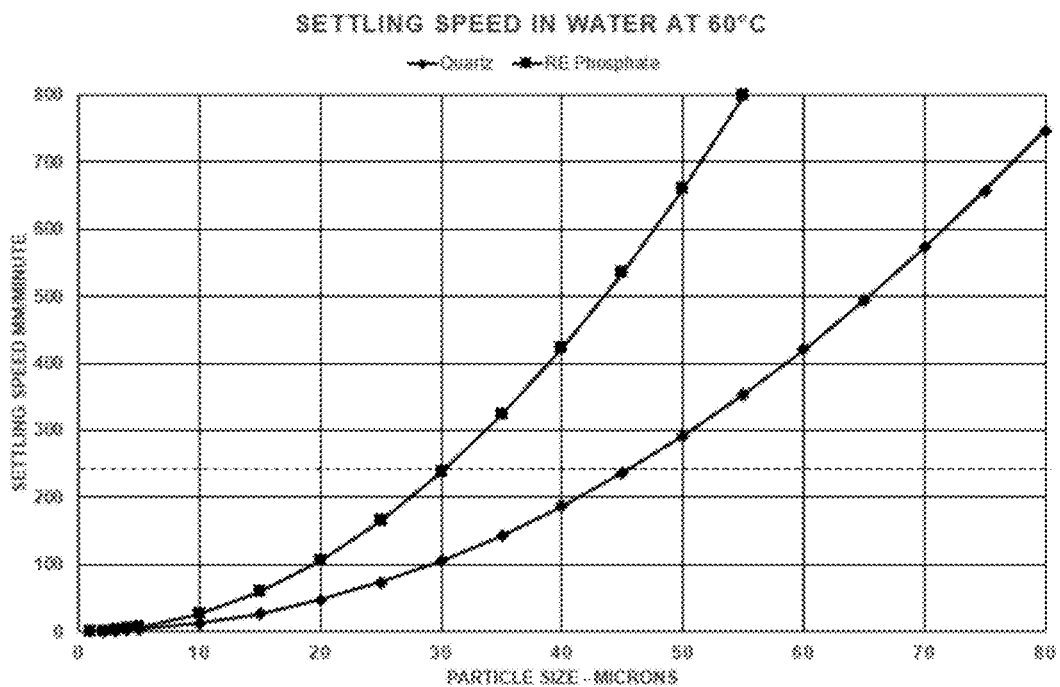

The examples presented above provide guidance with regard to operating conditions, and preferred upward flow velocities can easily be found by the person skilled in the art through simple experimentation. The flow velocities to be applied depend on the nature of the fluid medium, the operating temperature and the viscosity, and also the shape of the vessel. Furthermore, the Stokes Law calculation mentioned above provides sufficient guidance. It is known that temperature and viscosity may have also a significant effect. Elutriation may be favoured if undertaken with heated fluid (e.g. during the acid leaching process). The effect of both parameters in water at 60° C. may be seen in FIG. 7B, from which it may be concluded that, at an upward flow velocity of 240 mm/min, quartz particles greater than 45 μm might be expected to sink, while rare earth phosphate particles of less than 30 μm might be expected to rise, and emerge in the overflowing fluid.

Figure 7C:
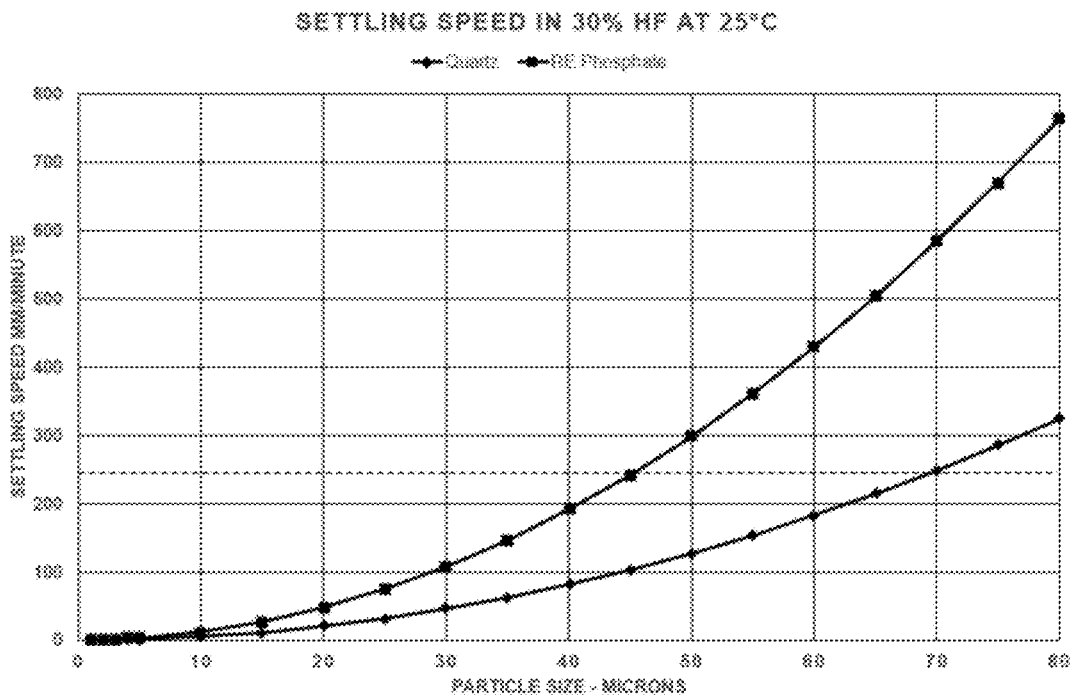

A further option is to operate the leaching process in elutriation mode. Figures are available for density and viscosity of an aqueous solution of hydrofluoric acid (30% wt), at a temperature in the region of 25° C. FIG. 7C illustrates the estimated settling speed of quartz and RE microparticles under these conditions. The plot indicates that, at an upward velocity of 240 mm/minute, quartz particles larger than 70 μm should be expected to descend, whereas RE microparticles smaller than 45 μm should be expected to rise, and be removed from the vessel carried out in the overflowing liquid.

On this basis, and since the nominal particle size range of the quartz is 85-225 μm (as noted above), it was decided to undertake a better quantified experiment in a water column with an upward flow velocity 240 mm/min.

Example 4

Figure 8:
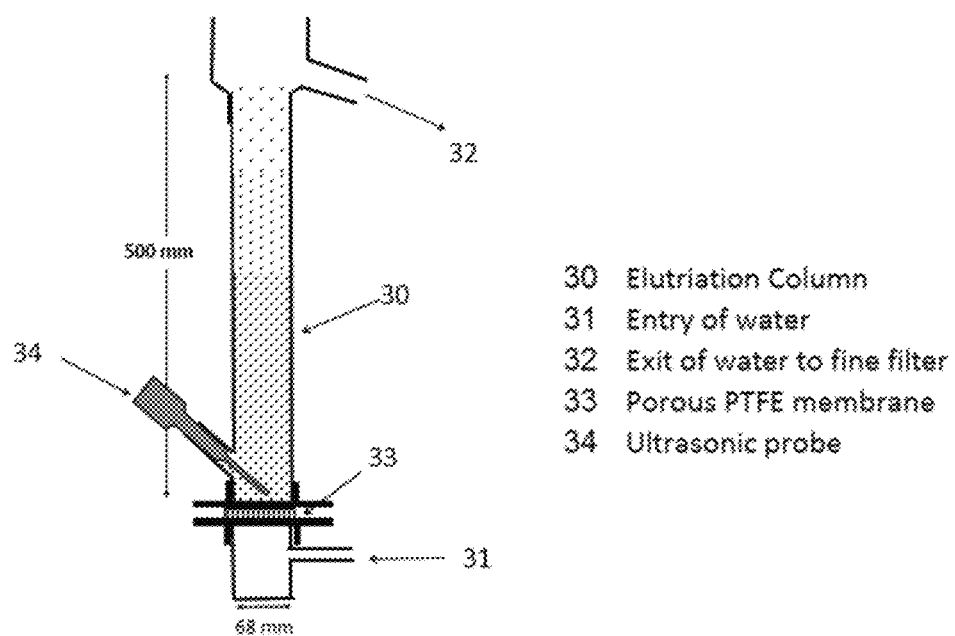
FIG. 8 is an experimental elutriation column incorporating ultrasonic agitation in accordance with one embodiment.

An experimental elutriation column incorporating ultrasonic agitation was assembled from PVC parts as illustrated in FIG. 8. The column itself (30) included a cylindrical tube of bore 68 mm, length 500 mm, and this was provided with an overflow (32) at the upper end. At the lower end, was an inlet for water (31), and a porous PTFE plate (33), through which water was supplied at a known rate. The ultrasonic probe (34, Qsonica, Q55) permitted ultrasonic agitation at controlled power when required.

Ultrasonic agitation is not essential, but is believed to be beneficial in aiding the detachment of RE microparticles from the grains of quartz. Thus, during operation in elutriation mode, and when elutriation of the RE microparticles is sought, ultrasonic agitation should be at low power, or alternatively applied intermittently, and only for brief periods., in order not to induce violent motion in the liquid phase.

The elutriator was connected to a supply of demineralised water at a temperature of approximately 20° C., with the flow rate adjusted to provide a mean upward velocity in the column of 240 mm/minute.

A slurry comprising 40.0 grams of quartz grain doped with 0.0112 grams of RE microparticles was added to the open top of the elutriation column. Ultrasonic agitation was applied to the slurry for 15 seconds (with the amplitude on the control box set to 70). The elutriator was allowed to operate for 30 minutes during which time ultrasonic agitation was applied for 10 seconds every 5 minutes.

Particles washed over the top of the column were collected on Whatman GF/F glass fibre filter disks with a nominal 0.7 μm particle retention.

The glass filter was subsequently dissolved in hydrofluoric acid to leave a residue of RE microparticles and quartz. After removal of the hydrofluoric acid, the RE microparticles and remaining quartz particles were separated using the heavy minerals analysis method described in patent U.S. Pat. No. 9,776,194 B2, and 0.0101g of RE microparticles were recovered, indicating separation and recovery of 90.2% by weight of the RE microparticles from the initial quartz powder.

Operating under these conditions the elutriation process also removed some of the finest quartz particles from the starting material, i.e. 1.0190 g, or 2.5% by weight of quartz introduced at the start. The majority of these quartz particles (75%) were of size less than 80 μm (the specified lower limit of the quartz powder being treated).

The potential of elutriation to eliminate a substantial proportion of the RE microparticles from a refined quartz powder is thus evident from these figures.

Example 5

Analysis of commercially available or describe quartz glass powders

Average analytical figures for one grade of powder over a period of several years and are illustrated in Table 2 below (ppM). These figures were obtained by laboratory analysis by this company, and also illustrated are the analytical figures for flame-fused quartz ingots made from these powders.

TABLE 2

|  |  | Al | Ca | Cr | Cu | Fe | Ge | K | Li | Mg | Mn | Na | Nd | Ti | Y | Zr |
|---|---|---|---|---|---|---|---|---|---|---|---|---|---|---|---|---|
| Powder | Average | 14.0 | 0.36 | 0.02 | 0.05 | 0.09 | 1.05 | 0.30 | 0.51 | 0.02 | 0.01 | 0.22 | 0.03 | 1.04 | 0.11 | 0.37 |
| Ingot | Average | 13.9 | 0.33 | 0.01 | 0.03 | 0.05 | 0.92 | 0.25 | 0.24 | 0.01 | 0.01 | 0.26 | 0.02 | 1.05 | 0.14 | 0.86 |

It is notable that the zirconium content appears to have increased as a result of fusion, and the most probable explanation is that fusion in quartz glass results in dissolution of some zirconia, rendering it more soluble in the hydrofluoric acid used to prepare the analytical solution. The only rare-earth impurity analysed regularly was yttrium present in an amount on average just over 0.1 ppM. However the figure varies over a period, and has ranged between 0.05 and 0.32 ppM. The other rare earth elements, also thorium and uranium, are present in smaller quantities, but may be expected to fluctuate over a comparable range, depending on the quality of the ore body from which the quartz was extracted.

On fusion of such a powder to glass, the elements listed in the above table may be present in a form which is soluble in the glass, and thus may be distributed relatively uniformly in solution. Furthermore, they may also be soluble in the acid (usually hydrofluoric acid) used in preparing a solution for analysis, rendering such analysis relatively easy. However, not illustrated in the above table are the majority of the rare earth elements, or thorium and uranium which are present in much lower levels, but may be present as discrete particles, which may remain undissociated and insoluble in the glass during and after fusion. Analysis of these localised impurities is problematic, particularly as the impurities may be present at concentrations of less than 1 ppM. Their concentration in the glass may vary widely through a sample, and furthermore they are frequently in the form of complex refractory phosphates which are insoluble in the acid which is used to prepare a solution for analysis. This means the analyst must resort to alternative techniques capable of analysis of low levels of impurities, for example neutron activation analysis of the glass made by fusion of the powder, and even then, a modestly sized sample may well not include a representative quantity of the relevant microparticles.

As an example, two ingots of flame-fused quartz generated by flame fusion were made using two batches of powder from the same source, and these were subjected to nuclear activation analysis with the results illustrated in Table 3. These results demonstrate the range of fluctuation which can occur in the concentration of these critical impurities.

TABLE 3

|  |  | Limit of Detection ppB | Sample 1 ppB | Sample 2 ppB | Powder |
|---|---|---|---|---|---|
| Ingot 1 | Y | 10 | 230 | 220 | 1 |
|  | Th | 10 | 31 | 21 |  |
|  | U | 10 | 42 | 34 |  |
| Ingot 2 Centre | Y | 10 | 55 | 58 | 2 |
|  | Th | 10 | <10 | 10 |  |
|  | U | 10 | 47 | 40 |  |
| Ingot 2 Edge | Y | 10 | 46 | 44 | 2 |
|  | Th | 10 | <10 | 10 |  |
|  | U | 10 | 50 | 52 |  |

In a further set of analytical data developed by the present applicant studying powders of several high purity quartz powders from two different suppliers over an extended period it has been found that the levels of cerium, yttrium, thorium and uranium generally lie within the ranges illustrated in Table 4 below. These powders have been fused to glass in the form of both rods, and tubes by melting in crucibles made from refractorymetal, the product being drawn continuously through a die, set in the base of the crucible.

TABLE 4

|  | ppB |  |  |
|---|---|---|---|
| Ce | 30 | to | 120 |
| Y | 20 | to | 145 |
| Th | 15 | to | 60 |
| U | 20 | to | 60 |

While these values might appear to be relatively small, it should be noted that these impurities are not dispersed uniformly but are present as a multitude of microparticles, the majority of which are of sub-micron dimensions (see FIG. 6), each of which can cause fibre breakage, or yield loss if the glass is used in certain in a semiconductor applications.

The contamination by microparticles has been detected in fused quartz, manufactured by various techniques, for example by flame fusion, by electric fusion, for example in glass melted and drawn from an electrically heated refractory metal crucible, as well as glass formed by plasma spray fusion (e.g. U.S. Pat. No. 6,269,663) of quartz crystal powder and built up on the external surface of an optical fibre preform to form a cladding layer included of fused natural quartz powder.

In such commercially available refined quartz powders, these refractory microparticles are generally all less than 25 μm in size, typically less than 5 μm, indeed the majority are much smaller typically less than 1 μm. Because of their extreme inertness and very high melting point, these microparticles have proved difficult to eliminate from quartz powders.

As noted above, fibre break studies have illustrated that particles of size less than 0.5 μm may cause breakage of an optical fibre if present in the cladding glass. As a consequence, the majority of the optical fibre industry has for many years demanded synthetic fused quartz, from which the absence of such particles could be guaranteed.

High quality fused quartz components are also used in the manufacture of semiconductor wafers, and again, in certain applications, these refractory particles may be a possible cause of yield loss. Thus fused quartz components are used to support the wafer during etching of the surface of the wafer in a plasma-etch process involving a fluorine-containing gas, during which some etching of the quartz component may take also place. This might be acceptable as the product of such etching is gaseous, i.e. silicon tetrafluoride, SiF4. However, if a refractory microparticle is exposed in this process, it may give rise to dust which can contaminate the wafer leading to unacceptable yield loss. It is furthermore notable that some of these refractory mineral particles contain thorium and uranium, and the presence of such radioactive species is particularly undesirable in a semiconductor fabrication process.

Thus, it is apparent that for both optical fibre and semiconductor applications fused quartz could be acceptable if these microparticles were eliminated or at least substantially reduced in the course of the quartz refinement process. Otherwise for critical applications it becomes necessary to use synthetic fused silica, which can be free from such refractory inclusions.

Although specific embodiments have been illustrated and described herein, it will be appreciated by those of ordinary skill in the art that a variety of alternate and/or equivalent implementations may be substituted for the specific embodiments illustrated and described without departing from the scope of the present embodiments. This application is intended to cover any adaptations or variations of the specific embodiments discussed herein. Therefore, it is intended that these embodiments be limited only by the claims and the equivalents thereof.

The invention claimed is:

1. A process for the refinement of a quartz powder, comprising
   separating microparticles of refractory minerals out of the quartz powder by an elutriation step, wherein the microparticles of refractory minerals comprise minerals containing rare earth metals and/or thorium and/or uranium; and
   carrying out the elutriation step in a fluidised bed reactor, in which a controlled upward flow of a liquid elutriation phase is provided, by which the microparticles of refractory minerals are carried upwards in the fluidised bed reactor;
   whereas the quartz powder remains in the lower region of the fluidised bed reactor.

2. The process according to claim 1, wherein the microparticles of refractory minerals carried upwards in the fluidised bed are either discharged out of the fluidised bed reactor or are separated from the liquid elutriation phase.

3. The process according to claim 2, wherein the liquid elutriation phase is recycled into the elutriation step and the microparticles of refractory minerals contained therein are separated from the elutriation phase by filtration.

4. The process according to claim 3, wherien the microparticles of refractory minerals are separated from the elutriation phase by filtration using a filter with a filter having a pore size of 0.7 µm or less.

5. The process according to claim 4, wherein the filter is an acid-resistant filter.

6. The process according to claim 1, wherein the separation of the microparticles of refractory minerals from the quartz powder is facilitated by means of ultrasonic agitation before or during elutriation.

7. The process according to claim 1, wherein the elutriation step is carried out before or after a calcination and/or hot chlorination step.

8. The process according to claim 1, wherein the particle size distribution of the refined quartz powder is homogenised before removal out of the fluidised bed reactor.

9. The process according to claim 8, wherein the homogenisation of the refined quartz powder is carried out by ultrasonic agitation, or by agitation caused by a flow of a liquid or gas.

10. The process according to claim 1, wherein the quartz powder to be refined has a size from 75 to 1000 µm, whereas the rare earth minerals have a particle size of less than 50 µm.

11. The process according to claim 1, wherein the liquid elutriation phase is a leaching an aqueous acid comprising one or more of hydrofluoric, hydrochloric, nitric and sulphuric acids.

12. A process for the refinement of a quartz powder, comprising separating microparticles of refractory minerals out of the quartz powder by an elutriation step, wherein the quartz powder to be refined has a size from 75 to 1000 µm, whereas the microparticles of refractory minerals have a particle size of less than 50 µm.

* * * * *